United States Patent

Lin

[11] Patent Number: 6,164,708
[45] Date of Patent: Dec. 26, 2000

[54] ADJUSTABLE SAFETY AND RAPIDLY ASSEMBLED CONNECTOR

[76] Inventor: Yen-Tseng Lin, No.21, Alley 9, Lane 27, Sec.5, Min Sheng E. Rd., Taipei, Taiwan

[21] Appl. No.: 09/296,868

[22] Filed: Apr. 21, 1999

[51] Int. Cl.⁷ .................................................. F16L 21/06
[52] U.S. Cl. .......................... 285/323; 285/421; 285/358; 285/410
[58] Field of Search .................................. 285/339, 323, 285/394, 358, 409, 410, 420, 421, 312

[56] References Cited

U.S. PATENT DOCUMENTS

| | | | |
|---|---|---|---|
| 464,893 | 12/1891 | Reid et al. | 285/312 |
| 1,261,687 | 4/1918 | Brandon | 285/312 |
| 2,689,141 | 9/1954 | Kiekhaefer | 285/410 |
| 4,522,430 | 6/1985 | Stromberg | 285/323 |
| 4,684,156 | 8/1987 | Rhodes | 285/421 |
| 4,834,431 | 5/1989 | Calmettes et al. | 285/410 |
| 5,277,460 | 1/1994 | Grainge | 285/421 |

FOREIGN PATENT DOCUMENTS

| | | | |
|---|---|---|---|
| 1045950 | 12/1958 | Germany | 285/421 |

*Primary Examiner*—Eric K. Nicholson
*Attorney, Agent, or Firm*—Rosenberg, Klein & Lee

[57] ABSTRACT

An adjustable safety and rapidly assembled connector includes a first joint, a second joint, two connecting seats, and a locking device. A sealing ring is installed within the connecting end of the second joint. A buckling groove is installed external the connecting end of the second joint. An inclined plane is installed on one side of the buckling groove. Each end of the two connecting seats is installed with a locking portion. A buckling body is projected from the inner portion of the buckling groove. An inclined plane is formed from one side of the buckling body. One ends of the two connecting seats are pivotally connected with connecting end of the first joint. When the two connecting seats are connected, the locking portions of two connecting seats are tightly locked by a locking device. The buckling bodies of the connecting seats are connected with the buckling groove on the connecting end of the second joint, and the inclined planes of the two connecting seats resist against the inclined plane of the second joint so that the second joint will move axially. The connecting end of the second joint resists against and press the sealing ling. Therefore, a well loosen-preventing effect is achieved. The present invention has a good safe and reliability. The locking device is easily operated. Thus, the force are uniformly applied.

3 Claims, 4 Drawing Sheets

ADJUSTABLE SAFETY AND RAPIDLY ASSEMBLED CONNECTOR

BACKGROUND OF THE INVENTION

1. Field of the Invention

The present invention relates to an adjustable safety and rapidly assembled connector, thereby, the fluid can not drain out from the connection of the joints in the present invention and structure will not loosen in a high pressure environment.

2. Description of the Prior Art

As shown in FIG. 1, the prior art joint of a water tube or other kind of tube includes two joints 10a and 11a. The connecting end of the two joints are connected with each other. Another ends of the two joints can be connected with another respective tubes.

Thereby, by the connection of the two joints 10a and 11a, the two tubes are connected with each other. One of the joints is pivotally with a buckling piece 12a the inner end of which is installed with a cam 13a. By rotating the two buckling pieces 12a, the cam 13 will be buckled with a round groove 14a with respective to another joint 11a. Thus, the two joints 10a and 11a are steadily connected. Also, a sealing ring 15a made by an elastic material (such as rubber) is installed between the two joints 10a and 11a for increasing the sealing property of connection and preventing the drainage of fluid.

However, after using for a period of time, in the prior art fast assembled joint, the sealing of the sealing ring 15a will reduce since the elastic fatigue of the material thus, the drainage between two joints can not be prevented effectively. Furthermore, when the two joints are connected, the two buckling pieces can not generate any axial force for applying to the two joints 10a and 11a, therefore, sealing ring 15a will not be actually clamped between the two joints 10a and 11a. Thus, a well sealing can not be achieved. Another, the two joints are connected by pressing two metal pieces, this connection is easy loosen in high pressure environment. Therefore, it has poor safety effect and reliability and needs much labor. Besides, the force of the two buckling pieces 12a are concentrated in two points, the force applied area are not uniform.

SUMMARY OF THE INVENTION

Accordingly, the object of the present invention is to provide an adjustable safety and rapidly assembled connector includes a first joint a second joint, two connecting seats, and a locking device. As two connecting seats are connected, the buckling body is buckled to the buckling groove of the connecting end of the second joint and the inclined planes of the two connecting seats will resist against the inclined plane of the second joint so that the second joint moves axially. The surface of the connecting end of second joint resists against a sealing ring, thus the sealing ring is actually clamped between the two joints, Therefore, a well sealing properly is achieved. After it has been used for a period of time, if the sealing is reduced due to elastic fatigue of the sealing ring, the locking device can be further locked so that the second joint moves axially toward the first joint in order that the sealing ring still retains a good sealing property. Therefore, the fluid can not drain out from the connection of the two joints and the structure will not loosen in a high pressure environment. The present invention has a good safety and reliability. The locking device is easily operated. Thus, the force are uniformly applied to the desired area. The present invention will be better understood and its numerous objects and advantages will become apparent to those skilled in the art by referencing to the following drawings in which:

DETAILED DESCRIPTION OF THE PREFERRED EMBODIMENT

Figure 1:
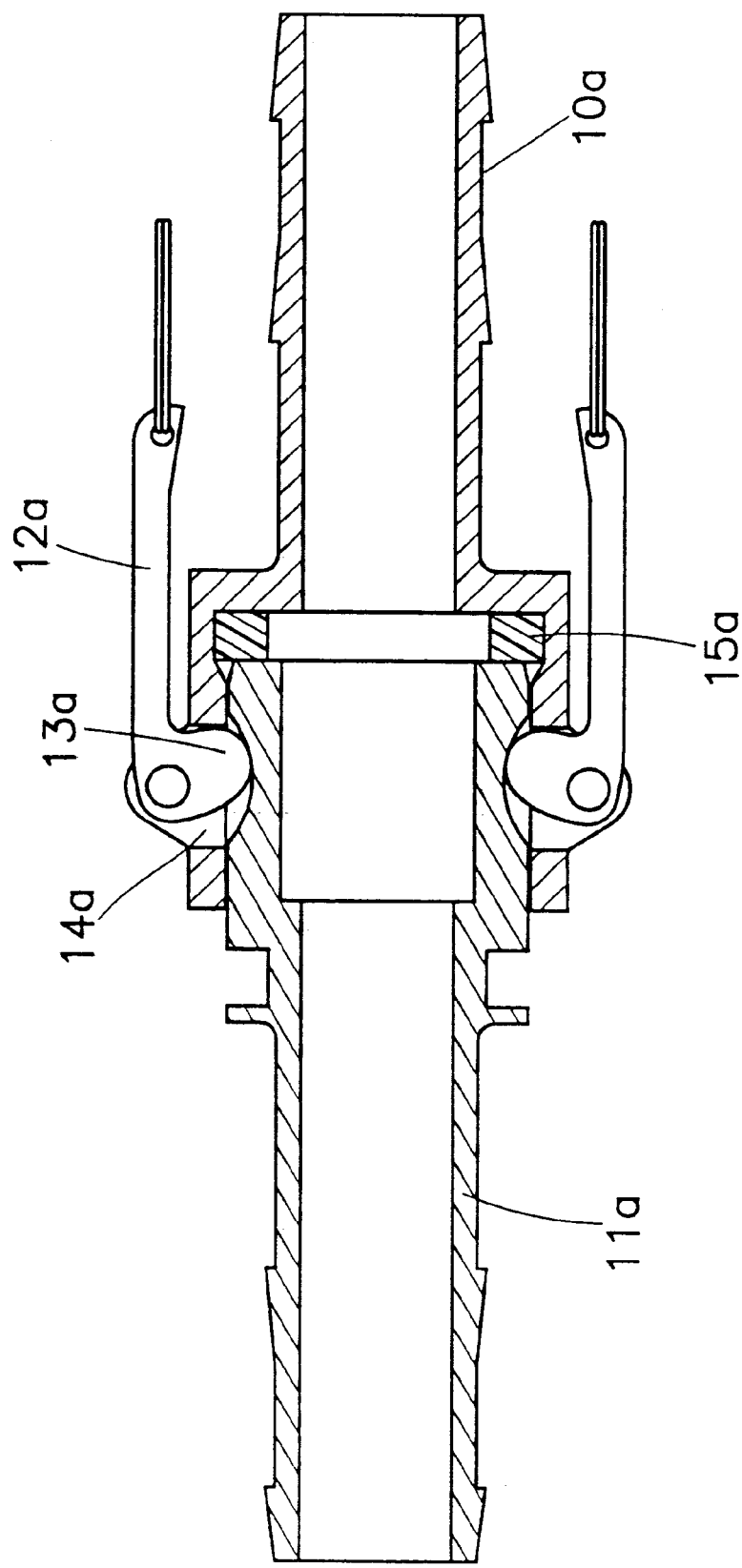
FIG. 1 is a plan cross sectional view of a prior art tube joint.
Figure 2:
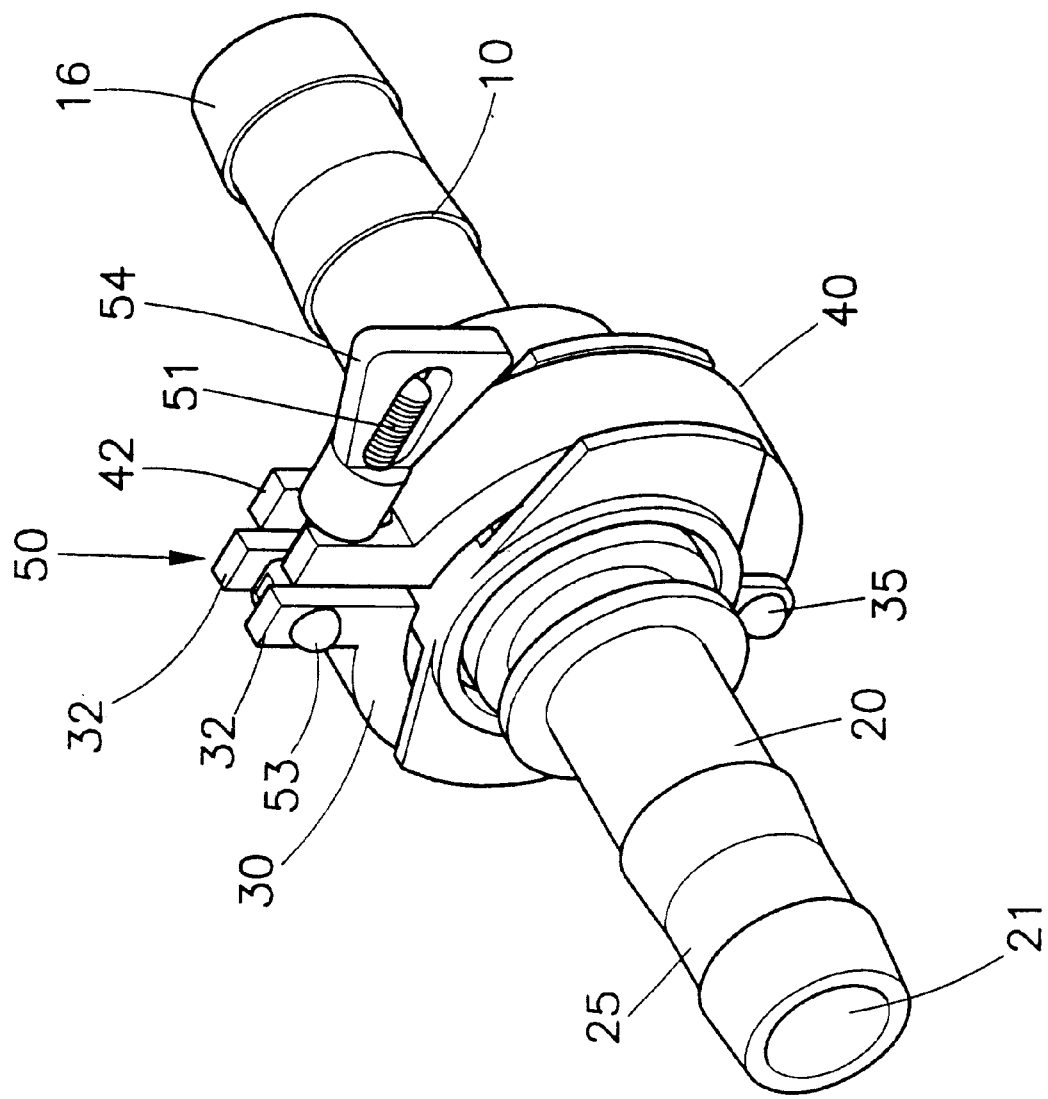
FIG. 2 is a perspective view of the present invention.
Figure 3:
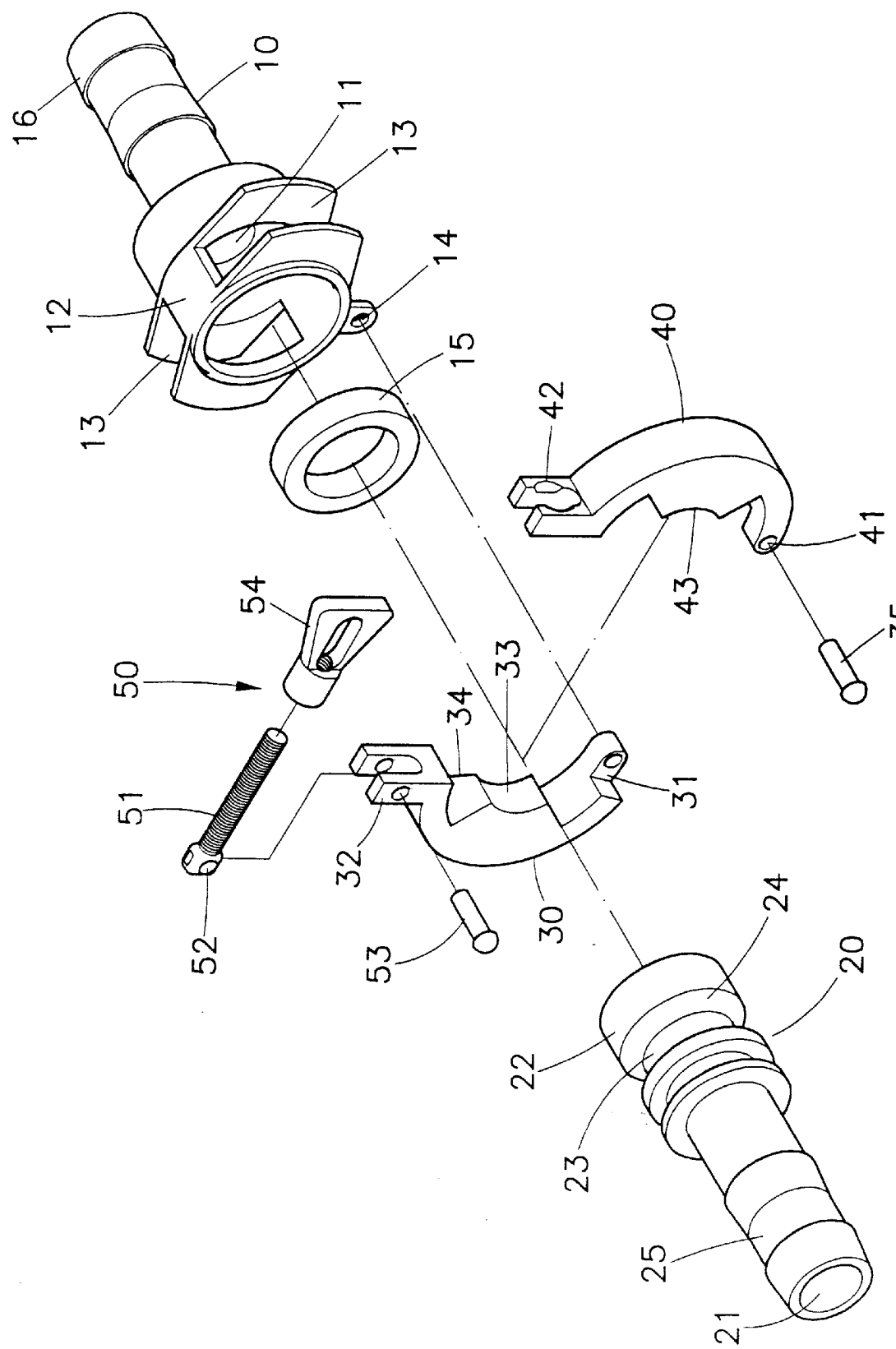
FIG. 3 is an exploded perspective view of the present invention.
Figure 4:
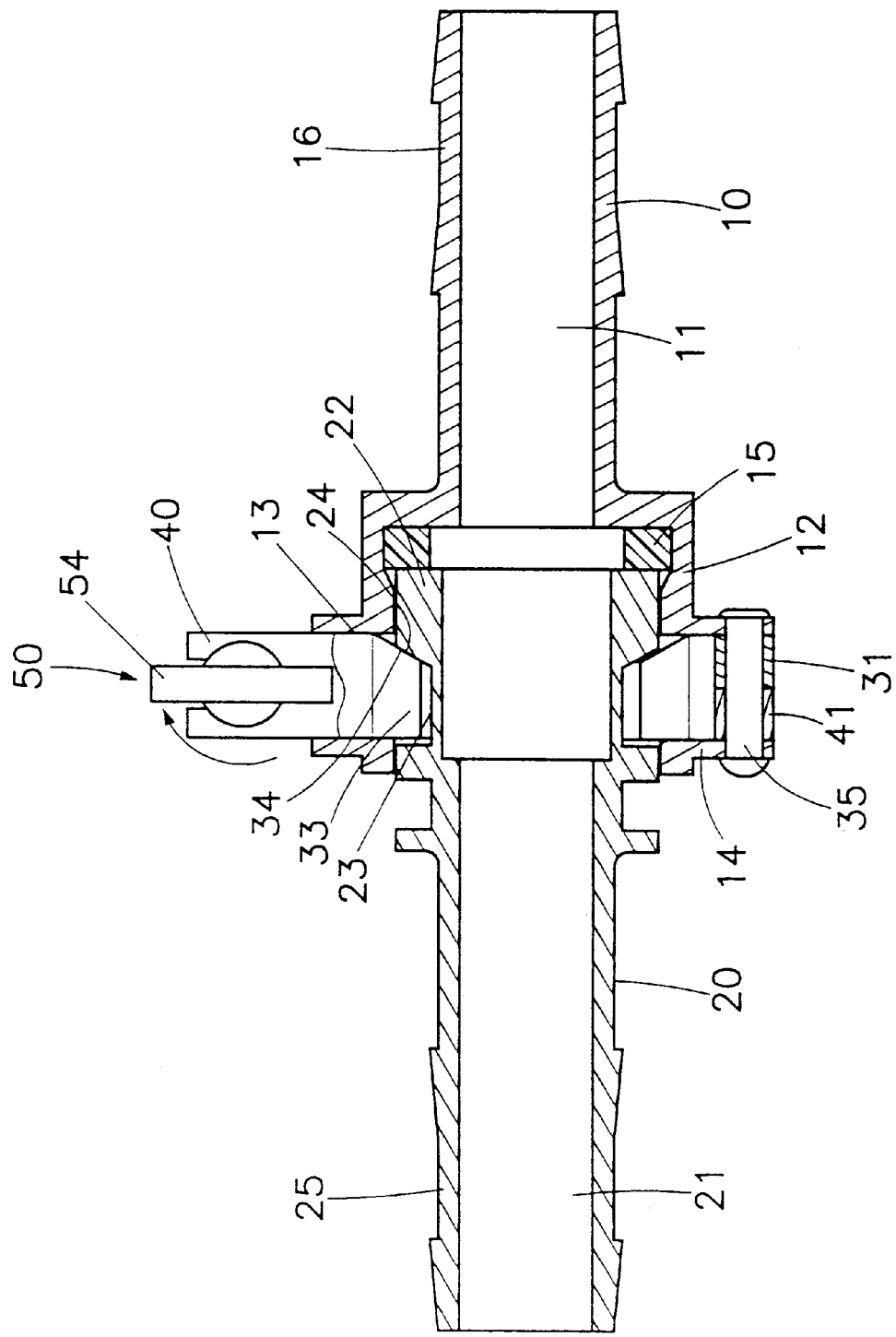
FIG. 4 is a plan cross sectional view of the present invention.

As shown in FIGS. 2, 3 and 4, the adjustable safety and rapidly assembled connector of the present invention comprises a first joint 10, a second joint 20, a first connecting seat 30, a second connecting seat 40 and a locking device 50. The first joint 10 is a round tube with varied inner radius, a tube 11 is penetrated through the joint in the axial direction. One end of the first joint 10 is formed with a Larger connecting end 12 and each side of the connected end 12 is installed with a groove 13. A pivotal portion 14 is installed outside the connecting end 12, while the inner part of the connecting end 12 is formed with a sealing ring 15. Another end of the first joint 10 is formed with a sleeve 16 for engaging with a tube.

The second joint 20 is a round tube with varied inner radius, a tube 21 is penetrated through the joint in the axial direction. One end of the second joint 20 is formed with a connecting end 22 which may be engaged with the first joint 10 and a buckling groove 23 is formed around the connecting end 22. An inclined plane 24 is installed on one side of the buckling groove 23 adjacent to the connecting end 22. Another end of the second joint 20 is formed with a sleeve 25 for engaging with another tube.

The second connecting seat 30 is a hollow hemispherical body, two ends of which are installed with respective pivotal section 31 and a locking portion 32 having a U shape. A buckling body 33 is projected from the interior of the first connecting seat 30. One side of the buckling body 33 is formed with an inclined plane.

The second connecting seat 40 is also a hollow hemispherical body, two ends of which are installed with respective pivotal section 41 and a locking portion 42 having a U shape. A buckling body 43 is projected from the interior of the first connecting seat 40. One side of the buckling body 43 is formed with an inclined plane (not shown in the figure, such as the inclined plane 34 on one side of the buckling body). The first connecting seat 30 and the second connecting seat 40 penetrate through the pivotal portions 31 and 41 by a pivotal shaft 35 to pivoted connect with the pivotal portion 14 of the second joint 10 so that the connecting seats 30 and 40 are pivotally connected with the connecting end 12 of the first joint 10. The connecting seats 30 and 40 may be extended or connected together by using the pivotal axis 35 as a fulcrum. When the two connecting seats 30 and 40 are connected, a hollow round body can be formed. Thus, the buckling bodies 33 and 43 of the respective connecting seats 30 and 40 are inserted into the connecting end 12 of the first joint 10 through the groove 13 of the first joint 10.

The locking device 50 has a stud 51 one end of which is installed with a pivotal portion 52. A locking nut 51 is screwedly connected on the stud 51. The stud 51 pass through the pivotal portion 52 to the locking portion 32 of the first connecting seat 30 by a pivotal axis 53 so that the locking device 50 is pivotally connected with the first connecting seat 30. The stud 51 is pivotal rotated by using the pivotal axis 53 as a fulcrum. By the aforementioned structure, an adjustable safety and rapidly assembled connector is assembled.

As shown in FIGS. 2 and 4, in using the present invention, the sleeves 16 and 25 of the first joint 10 and the second joint 20 are connected with respective tubes (not shown). By connecting the two joints 10 and 20, the two tubes are connected together. When the two joints 10 and 20 are to be connected, the connecting end 22 of the second joint 20 is inserted into the connecting end 12 of the first joint 10. Then, the first connecting seat 30 and the second connecting seat 40 are tightly locked by the locking device 50. Thereby, the stud 51 of the locking device 50 is rotated by using the pivotal axis 53 as a fulcrum, and the free end of the stud 51 is engaged with the locking portion 42 of the second connecting seat 40. Then, the locking nut 54 is located outside the locking portion 42. By rotating the locking nut 54, the locking portion 42 of the second connecting seat 40 is pushed so that the locking portion 32 and 42 of the two connecting seats 30 and 40 are locked tight. Therefore, the buckling bodies 33 and 43 of the two connecting seats 30 and 40 are steadily buckled to the buckling groove 23 of the second joints 20. Accordingly, the two joints 10 and 20 are tightly locked and connected by the two connecting seats 30 and 40.

In the present invention, by installing a locking device 50, the locking force can i)e properly adjusted, and, an axial force is generated between the two joints 10 and 20. When the locking nut 54 of the locking device 50 are rotated to a tightly locking direction, the locking nut 54 will push the locking portions 32 and 42 of the two connecting seats 30 and 40 to perform a clamping action. Then, the inclined plane 34 of the first connecting seat 30 and the inclined plane (not shown) of the second connecting seat 40 will be in contact with the inclined plane 24 of the second joint 20, so that the second joint 20 is axially moved toward the first joint 10. Therefore, the surface of connecting end 22 of the second joint 20 will contact against the sealing ring 15 so that the sealing ring is actually clamped between the two joints 10 and 20, Therefore, a good sealing is formed, Moreover, after the present invention has been used for a period of time, if the sealing property of the sealing ring 15 is reduced due to elastic fatigue. The locking nut 54 of the locking device 50 can be properly locked again so that the inclined planes (not shown) of the first connecting seat 30 and the second connecting seat 40 further resists against the inclined plane 24 of the second joint 20. Thus, the second joint 20 will axially move toward the first joint 10, and the sealing ring still retains a well sealing property in order to prevent the fluid to drain out from the connection of the two joints 10 and 20. Also, it will not drain as passing through a high pressure. Therefore, a well loosen- preventing effect is achieved. The present invention has a good safety and reliability. The locking device 50 is easily operated. The force applied to the connecting seat 30 and 40 is in a circular surface. Thus, the force is uniformly applied.

Therefore, by the present invention, the defect of the prior art, such as elastic fatigue, non-uniform force applied area, wasted labor, and bad safety and reliability, has been improved. Therefore, the present invention is actually a practically a novel invention. Although the present invention has been described using specified embodiment, the examples are meant to be illustrative and not restrictive. It is clear that many other variations would be possible without departing from the basic approach, demonstrated in the present invention.

Description of the Numerals in FIGS.

| | | |
|---|---|---|
| 10 First joint | | |
| 11 Tube | 12 Connecting end | 13 Groove |
| 14 Pivotal portion | 15 Sealing ring | 16 Sleeve |
| 20 Second joint | | |
| 21 Tube | 22 Connecting end | 23 Buckling groove |
| 24 Inclined plane | 25 Sleeve | |
| 30 First connecting seat | | |
| 31 Pivotal portion | 32 Locking portion | 33 Buckling body |
| 34 Inclined plane | 35 Pivotal axis | |
| 40 Second connecting seat | | |
| 41 Pivotal portion | 42 Locking portion | 43 Buckling body |
| 50 Locking device | | |
| 51 Stud | 52 Pivotal portion | 53 Pivotal axis |
| 54 Locking nut | | |
| 10a Joint | 11a Joint | 12a Spanner |
| 13a Cam | 14a Groove | 15a Sealing ring |

What is claimed is:

1. An adjustable safety and rapidly assembled connector comprising:

a first joint with tubes therewithin, one end of the first joint being formed with a connecting end, the connecting end being installed with a groove, and a sealing ring being installed within the connecting end;

a second joint with tubes therewithin, one end of the second joint being formed with a connecting end which can be connected within the connecting end of the first joint, a buckling groove being installed on the outer portion of the connecting end, and an inclined plane being installed on one side of the buckling groove;

two connecting seats, each end of which being installed with a respective locking portion, a buckling body being installed within the connecting seat, one side of the buckling body being formed as an inclined plane, the two connecting seats being pivotally connected to the connecting end of the first joint, as the two connecting seats being connected, the buckling body being connected with the buckling groove of the second connecting end, thus, the inclined plane of the connecting seat resists against the inclined plane of the second joint so that the second joint moves axially; and a locking device having a stud and a locking nut for screwedly locking the locking portions of the two connecting seats.

2. The adjustable safety and rapidly assembled connector as claimed in claim 1, wherein other ends of the first joint and the second joint are formed with respective sleeves.

3. The adjustable safety and rapidly assenbled connector as claimed in claim 1 wherein the locking nut is connected above the stud of the locking device, one end of the stud is pivotally, connected with thc locking poition of one of the connecting seats, the free end of the stud is suitable for the locking portion of another connecting seat, the locking nut is located outside the locking portion so that the rotation of the locking nut cause the locking portions of the two connecting seats to be tightly locked.

\* \* \* \* \*